(12) United States Patent
Szczap

(10) Patent No.: US 11,845,028 B2
(45) Date of Patent: Dec. 19, 2023

(54) APPARATUS AND METHOD FOR CLEANING FILTER CARTRIDGES

(71) Applicant: Spraying Systems Co., Wheaton, IL (US)

(72) Inventor: Joseph P. Szczap, Naperville, IL (US)

(73) Assignee: Spraying Systems Co., Wheaton, IL (US)

( * ) Notice: Subject to any disclaimer, the term of this patent is extended or adjusted under 35 U.S.C. 154(b) by 38 days.

(21) Appl. No.: 17/557,804

(22) Filed: Dec. 21, 2021

(65) Prior Publication Data

US 2022/0193590 A1    Jun. 23, 2022

Related U.S. Application Data

(60) Provisional application No. 63/128,934, filed on Dec. 22, 2020.

(51) Int. Cl.
| | | |
|---|---|---|
| *B01D 41/04* | (2006.01) | |
| *B08B 9/023* | (2006.01) | |
| *B08B 9/032* | (2006.01) | |
| *B08B 13/00* | (2006.01) | |

(52) U.S. Cl.
CPC .............. *B01D 41/04* (2013.01); *B08B 9/023* (2013.01); *B08B 9/0321* (2013.01); *B08B 9/0323* (2013.01); *B08B 13/00* (2013.01); *B08B 2209/032* (2013.01)

(58) Field of Classification Search
CPC ....... B08B 13/00; B08B 9/023; B08B 9/0323; B08B 9/0321; B08B 2209/032; B01D 41/04
See application file for complete search history.

(56) References Cited

U.S. PATENT DOCUMENTS

| | | | | |
|---|---|---|---|---|
| 3,608,567 A | * | 9/1971 | Neill, Jr. ................ | B01D 46/79 134/152 |
| 3,650,283 A | * | 3/1972 | Lang ..................... | B01D 41/04 134/143 |
| 5,135,580 A | * | 8/1992 | Cantrell ................ | B08B 9/0826 134/152 |

(Continued)

FOREIGN PATENT DOCUMENTS

| | | |
|---|---|---|
| EP | 1370374 B1 | 6/2006 |
| WO | WO 2008/089552 A1 | 7/2008 |

OTHER PUBLICATIONS

European Patent Office, International Search Report and Written Opinion in corresponding International Patent Application No. PCT/US2021/064601 dated Apr. 13, 2022 (13 pages).

*Primary Examiner* — Benjamin L Osterhout
(74) *Attorney, Agent, or Firm* — Leydig, Voit & Mayer, Ltd.

(57) ABSTRACT

A system for cleaning filter cartridges having a cylindrically configured filter media. The cleaning system includes a tank for containing a cleaning liquid, and an open-sided cage for removably receiving and containing one of the filter cartridges to be cleaned. The cage is supported on a drive shaft of a motorized drive that is positionable for disposing the open-sided cage and filter cartridge contained therein in cleaning liquid in the tank and is selectively operable for rotating the open-sided cage and filter cartridge contained therein during a cleaning cycle for cleaning the filter media of the contained filter cartridge.

13 Claims, 14 Drawing Sheets

(56) References Cited

U.S. PATENT DOCUMENTS

| | | | | |
|---|---|---|---|---|
| 6,966,935 B1 * | 11/2005 | Neighbors | ............ | B01D 46/48 |
| | | | | 55/498 |
| 9,675,910 B1 * | 6/2017 | Wade | ................. | B01D 29/0077 |
| 2017/0284115 A1 * | 10/2017 | Rejniak | ............. | B01D 29/6446 |
| 2020/0406182 A1 * | 12/2020 | Grieve | ............... | B01D 46/0005 |

* cited by examiner

APPARATUS AND METHOD FOR CLEANING FILTER CARTRIDGES

CROSS-REFERENCE TO RELATED APPLICATIONS

This patent application claims the benefit of U.S. Provisional Patent Application No. 63/128,934, filed on Dec. 22, 2020, which is incorporated by reference.

FIELD OF THE INVENTION

The present invention relates to an apparatus and method for cleaning filter cartridges, and particularly, for cleaning filter cartridges having a pleated filter media.

BACKGROUND OF THE INVENTION

Filter cartridges are used in many powder processing systems, such as spray dryers, fluid bed processing, dust collectors, and the like. The filter media typically is pleated and retained in cylindrical fashion. The filter media commonly is made of paper, felt, or woven fabric, and covered with a Teflon or like membrane for improved particle retention and for providing a relatively smooth surface for release of the particles during cleaning.

Such cartridge filters, as the cartridge filter 10 depicted in FIG. 3, typically have a pleated filter media 11 which is arranged in cylindrical form with metal end caps 12, 14 on top and bottom sides thereof. The end caps 12, 14 commonly are fixed in place on the filter media 11 with a silicon or epoxy type potting material. The filter media 11 may be supported on the inside with an expanded metal mesh in a known manner and on the outside by axially spaced circumferential bands 15 for keeping the pleats in place.

Such filter cartridges must be periodically cleaned of accumulated dust and foreign matter for maintaining filtering efficiency. The pleats of the filter media, however, form pockets that trap material and make them difficult to clean. Common cleaning techniques have been blowing with high pressure air, vacuuming, pressure washing, and soaking in harsh chemicals. When cleaning the cartridges with compressed air or gas, either from the inside or the outside, the gas forces can delaminate the outer membrane away from the filter material, destroying its effectiveness. Cleaning of the cartridge filters with compressed air in an open environment also creates dust clouds that can contaminate the surroundings, pose health issues to the operators, and present an explosive hazard. Pressure washing of the filter media, like forced air cleaning, can delaminate for the filter media, as well as present waste water contaminant issues. Pressure cleaning, either by compressed air or water, also has a tendency to force small particles deep into the filter media rendering the filters less effective. Vacuuming also can cause mechanical damage to the filter and has limited effectiveness in that vacuum tools cannot get into the pleats, especially at the ends where the pleats meet the potted end caps. Puncturing of the media also can occur. When cleaning cartridges by soaking them in or using harsh chemicals, it is common to over saturate or delaminate the filter media.

All of the foregoing methods also are operator dependent and are difficult to carry out on a repeatable basis since the cleaning steps are not necessarily effected in a consistent manner. It also is difficult to prevent cross contamination of released powder during cleaning.

OBJECTS AND SUMMARY OF THE INVENTION

It is an object of the present invention to provide a system for cleaning filter cartridges having a pleated filter media that is more effective and reliable in usage.

Another object is to provide a system for cleaning filter cartridges as characterized above which can be operated in a repeatable fashion for controlled cleaning of the filter media without damage to the filter media or delamination of outer membranes.

A further object is to provide a system for the above kind that is operable for simultaneously cleaning a plurality of filter cartridges.

Yet another object is to provide a system for cleaning filter cartridges of the foregoing type that can be operated without creating a harmful environment to the operator.

Still a further object is to provide a system of cleaning filter cartridges as indicated above that is economical in construction and simple in operation.

Other objects and advantages of the invention will become apparent upon reading the following detailed description and upon reference to the drawings.

Figure 1:
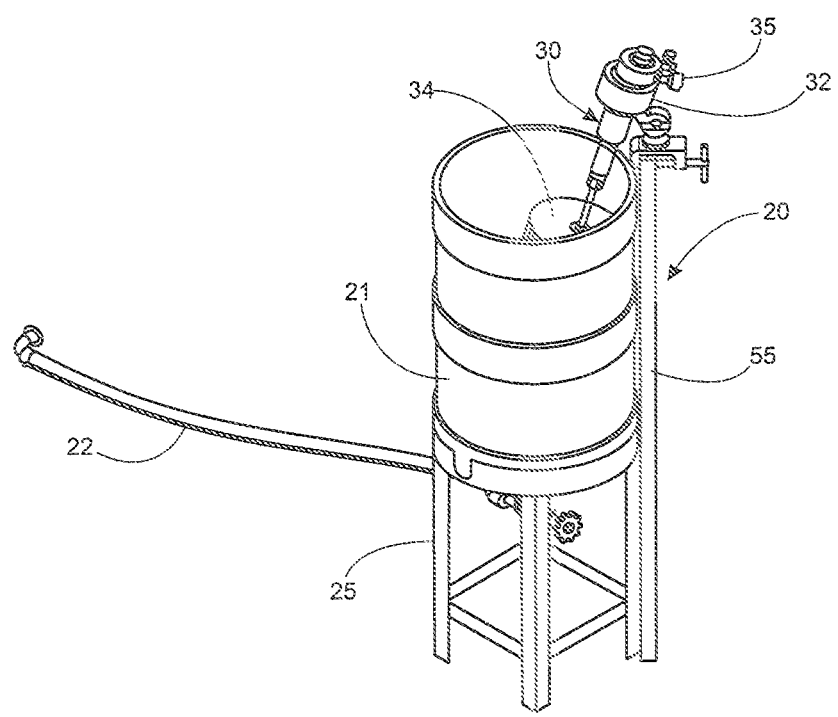
FIG. 1 is a perspective of an illustrative filter cartridge cleaning system in accordance with the invention.
Figure 2:
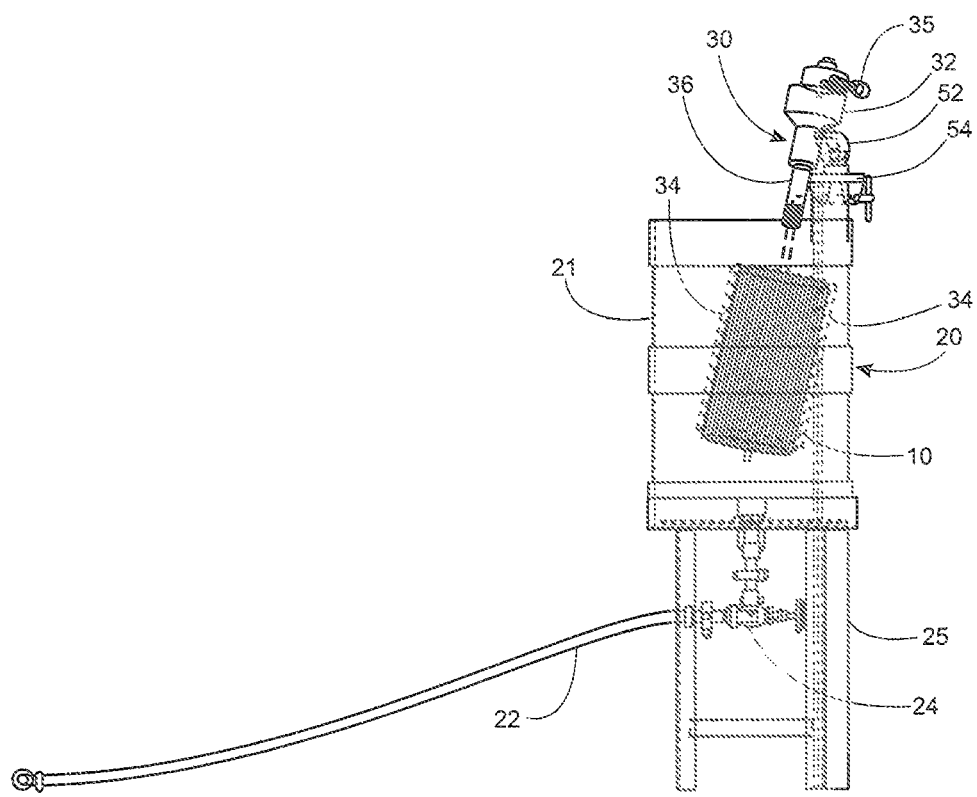
FIG. 2 is a side elevational view of a filter cartridge cleaning system shown in FIG. 1.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE PREFERRED EMBODIMENTS

Figure 3:
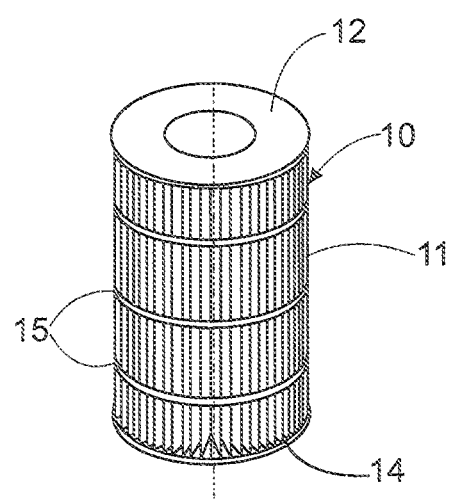
FIG. 3 is an enlarged perspective of a typical filter cartridge for cleaning by the illustrated filter cartridge cleaning system.
Figure 4:
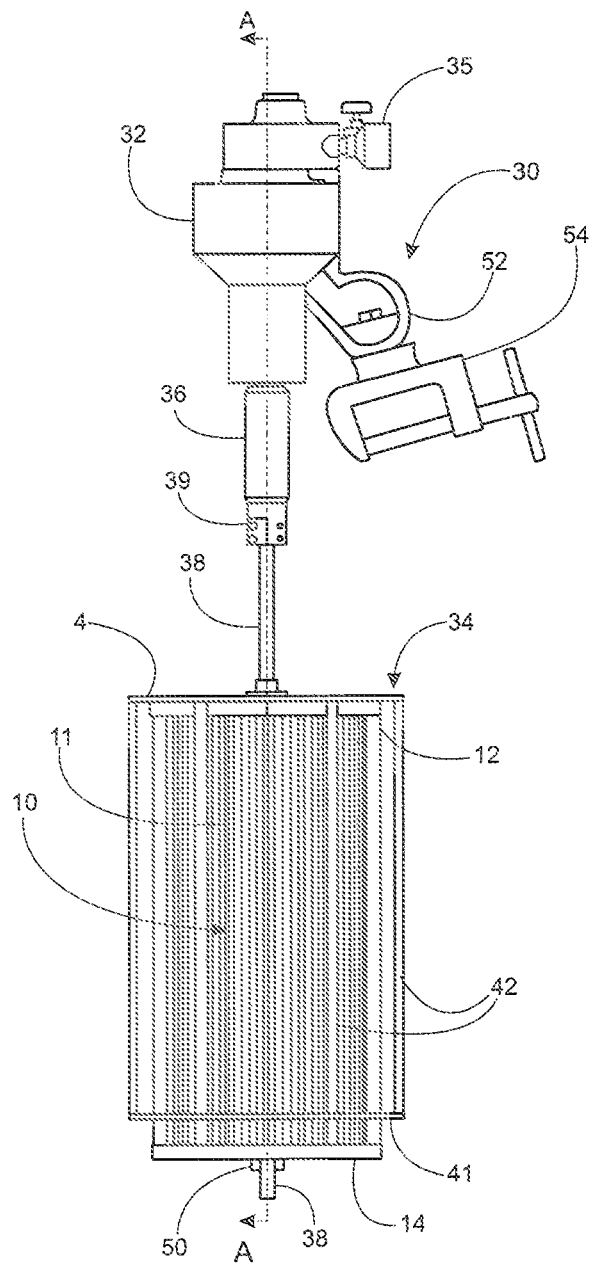
FIG. 4 is an enlarged side elevation of the motorized drive for supporting and rotating a filter cartridge during a cleaning cycle.
Figure 5:
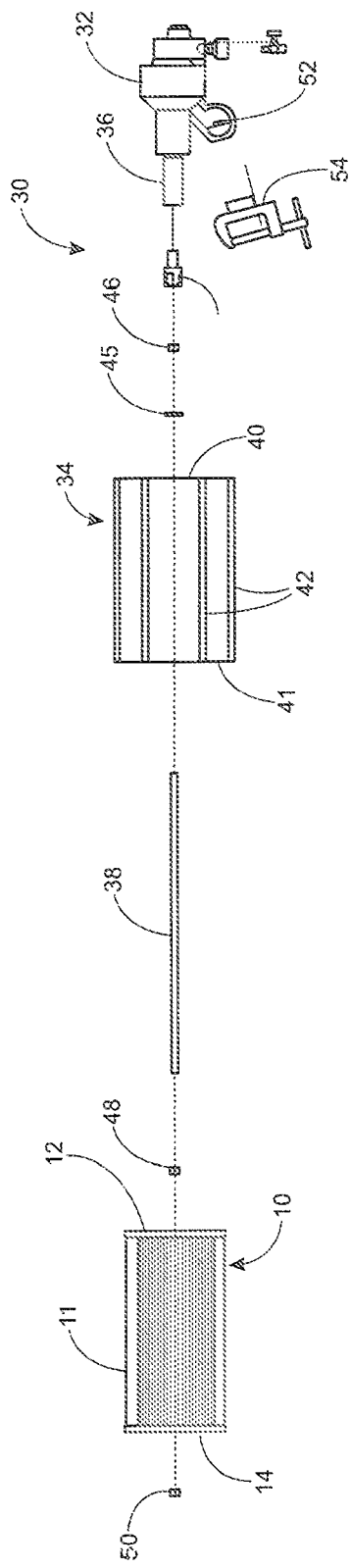
FIG. 5 is an exploded view of the motorized drive shown in FIG. 4.
Figure 6:
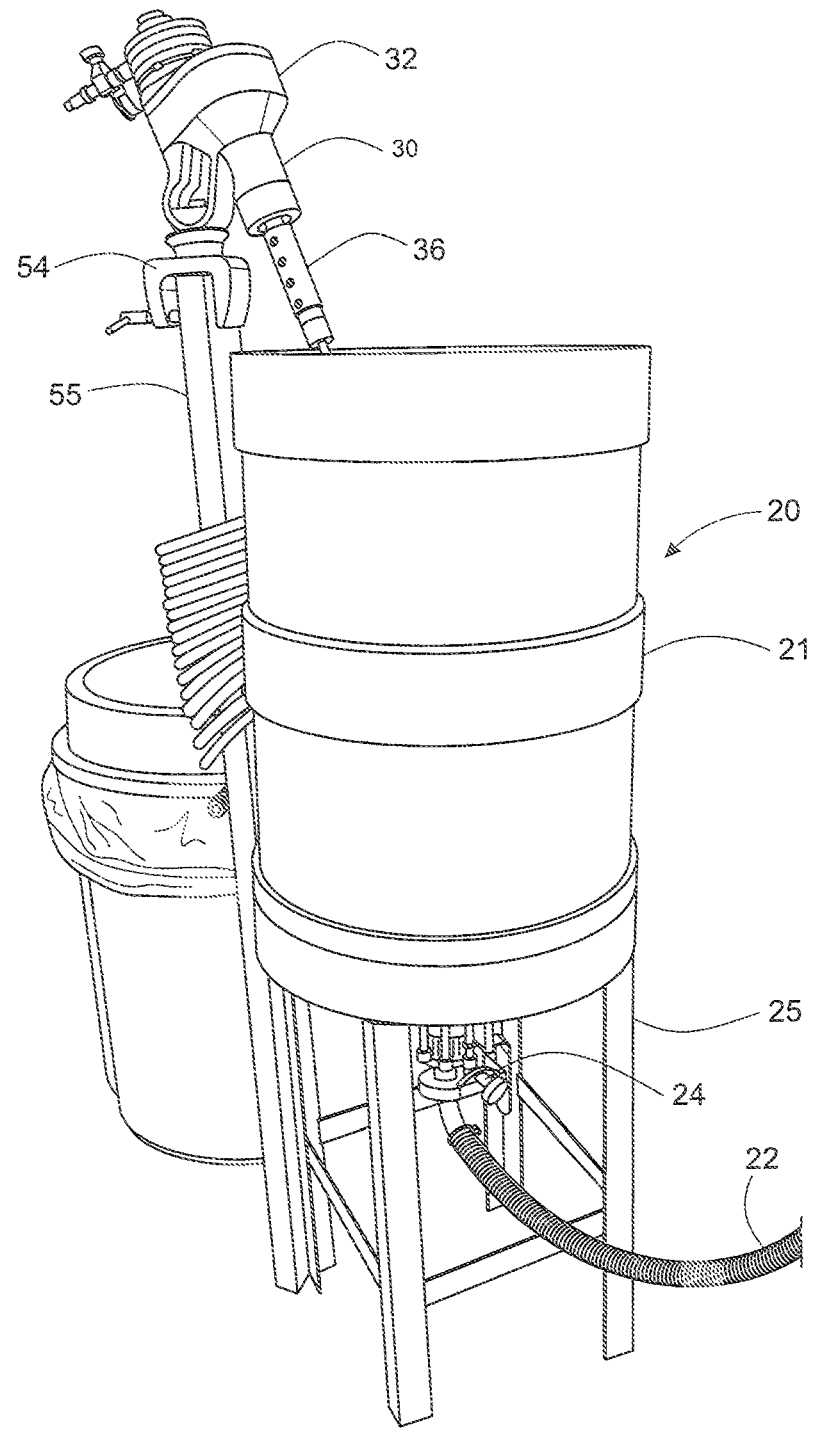
FIG. 6 is a more detailed view perspective of the illustrated filter cartridge cleaning system.
Figure 7:
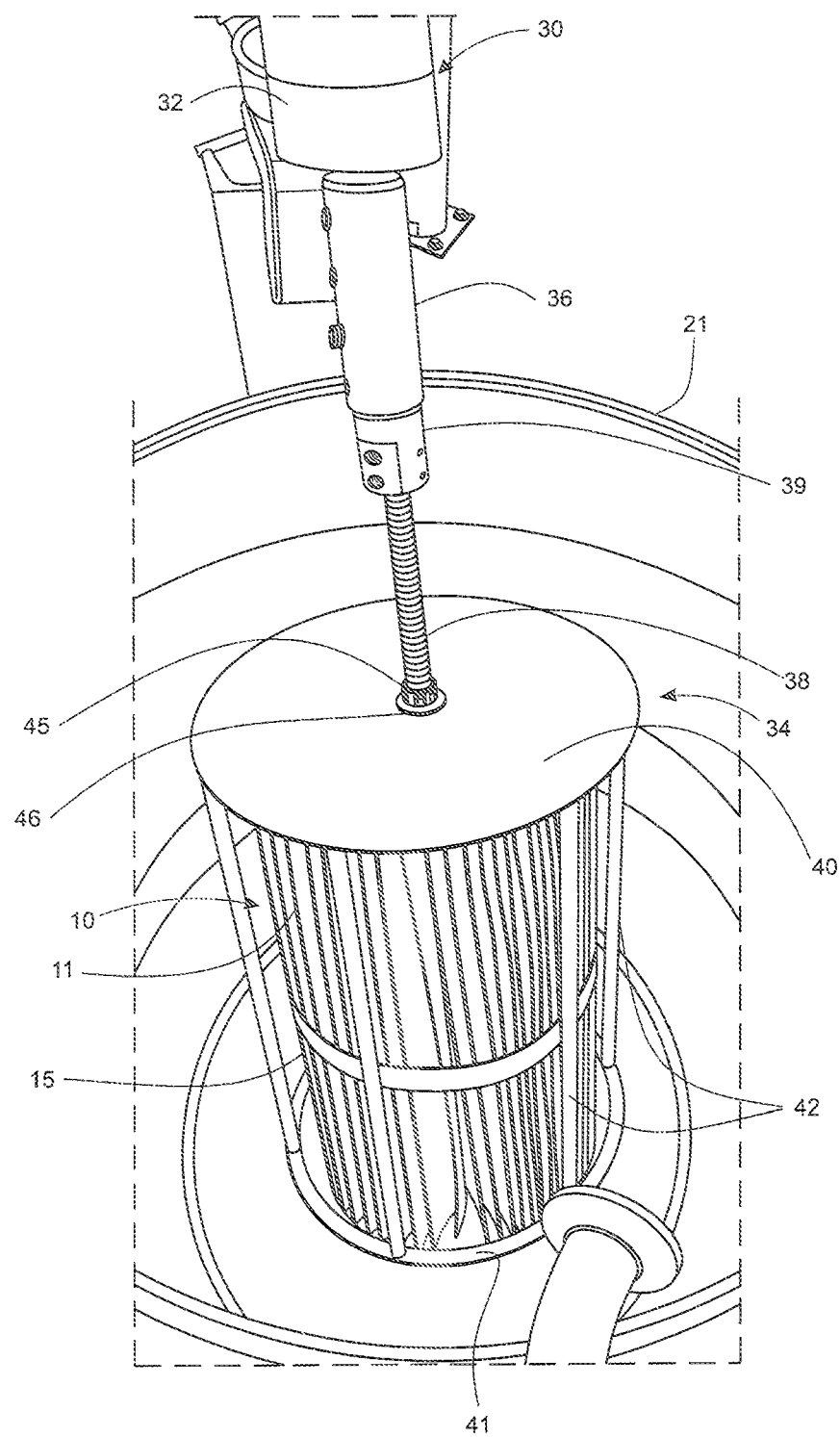
FIG. 7 is a perspective of the motorized drive of the filter cartridge cleaning system shown in FIG. 6 with a filter cartridge containing cage thereof disposed within a cleaning tank.
Figure 8:
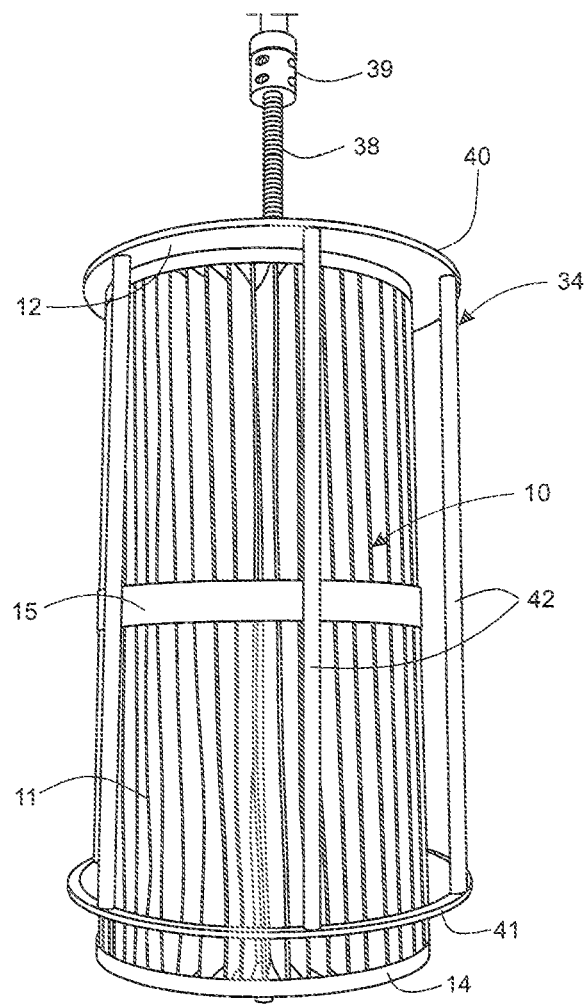
FIG. 8 is an enlarged perspective of the filter cartridge cage and contained filter cartridge shown in FIG. 7.
Figure 9:
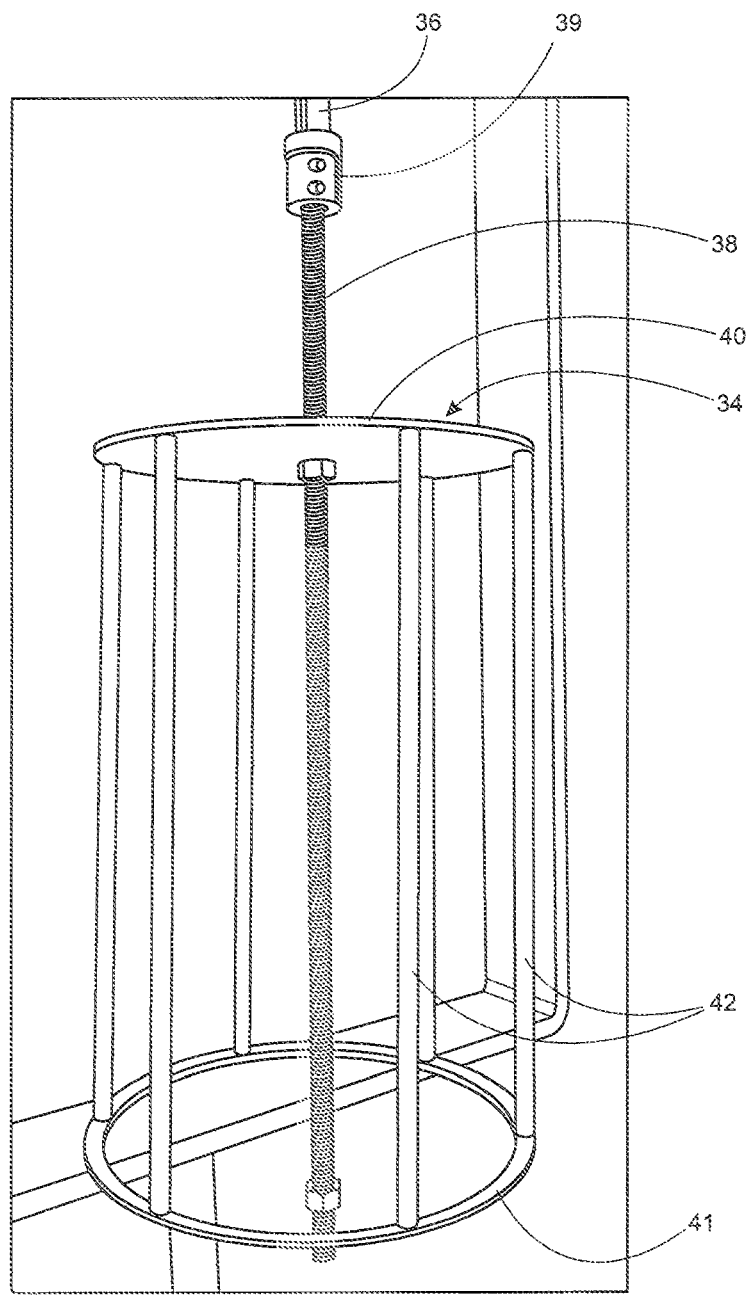
FIG. 9 is an enlarged perspective of the filter cartridge cage supported on a drive rod of the motorized drive of the illustrated system with the filter cartridge removed.

Referring now more particularly to FIGS. 1-9 of the drawings, there is shown an illustrative filter cleaning system 20 in accordance with the invention for cleaning filter cartridges 10 of the type depicted in FIG. 3. The illustrated system 20 includes an upwardly opening tank 21 into which cleaning liquids, such as potted tap water, detergents, and other cleaning chemicals, may be selectively introduced and during a cleaning cycle and a liquid outlet line 22 coupled to a selectively operable drain valve 24 for enabling draining of the tank 21 following a cleaning cycle. The tank 21 in this case is disposed off the floor on a support stand 25.

In carrying out this embodiment, the cleaning system 20 includes a motorized drive 30 for supporting and rotating a filter cartridge 10 during a cleaning operation. The illustrative motorized drive 30 includes a drive motor 32 and a filter cartridge cage 34 for supporting a filter cartridge 10 during the cleaning cycle. The drive motor 32 may be a conventional reversibly, operable air motor having a control valve 35 for controlling the introduction of compressed air to the motor 32. The drive motor 32 has an output shaft 36 coupled to a threaded drive rod 38, such as by a conventional split ring adapter 39. The cage 34 in this case includes an upper circular support plate 40, a lower annular ring 41 sized larger than the diameter of the filter cartridges 10 to be cleaned, and a plurality of circumferentially spaced support rods 42 interconnected between the upper support plate 40 and lower ring 41 such that open sides of the cage enable cleaning fluid to enter the cage during a cleaning cycle as will be apparent.

For securing the cage 34 to the threaded drive rod 38, the upper support plate 40 of the cage has a central opening for positioning onto the threaded drive rod 38 into engagement with a washer 45 and nut 46 prepositioned on the drive rod 38. A second nut 48 is threaded onto the drive rod 38 into engagement with an underside of the support plate 40 for securing the cage 34 to the drive rod 38.

For supporting a filter cartridge 10 to be cleaned, the filter cartridge 10 is positionable onto the threaded drive rod 38 through central openings in the upper and lower end caps 12, 14 where it is securely retained against the upper support plate 40 of the cage 34 by a bottom nut 50 threaded onto the threaded drive rod 38. It will be appreciated that upper end cap 12 of the filter cartridge 11 has a central opening larger in diameter than the nut 48 such that the end cap 12 can be held firmly against the underside of the cage support plate 40, while the lower filter cartridge end cap 14 has a relatively small diameter such that the bottom nut 50 engages the end cap 40 and maintains the filter cartridge 10 in firm engagement with the cage 34 for rotation with the cage 34 as an incident to rotation of the drive rod 38 during a cleaning cycle.

For supporting the filter cartridge containing cage 34 in the tank 21, the drive motor 32 in this case has a clip 52 that can be manually bolted to a clamp 54 mountable on an upper extension post 55 of the tank stand 25. In the illustrated embodiment, the drive motor 32 is supported such that the threaded drive rod 38 and cage 34 are disposed at a small angle to the vertical.

With the filter cartridge 10 disposed within the cage 34 in cleaning fluid introduced into the tank 21, the drive motor 32 may be operated to selectively rotate the cage 34 and filter cartridge 10 during a cleaning cycle. It has been found that such rotation effects gentle, but effective cleaning of accumulated solids on the filter media, even in crevices in the filter media between the plates and in difficult to reach areas of the filter media 11 adjacent the end caps 12, 14. To that end, it has been found that the elongated support rods 42 unexpectedly create small eddy currents that agitate the cleaning fluid and pull material out of the plates and difficult to clean areas of the filter media 11 as the cage 34 and filter cartridge 10 are rotated in the cleaning fluid. It has been found that the rods 42 may take different forms, such as cylindrical or rectangular in cross section. The drive motor 32 furthermore may be sequentially operated in forward and reverse directions, or in an agitation mode, to facilitate dislodging of difficult solids from the filter media 11.

While the operation of the cleaning system 20 may be optimized for particular cleaning requirements, in a typical cleaning operation, the system may be operated on a sequential basis, by way of example, as follows:

1) Fill the tank with hot/cold potable water
2) Allow motor to rotate about 15 minutes
3) Drain water
4) Fill tank with water and detergent
5) Allow motor to rotate about 15 minutes
6) Drain water and detergent
7) Fill tank with water
8) Allow motor to rotate 5 minutes
9) Drain water
10) Fill tank with water and sanitizer
11) Allow motor to rotate 5 minutes
12) Drain water and sanitizer
13) Fill tank with DI/RO water
14) Allow motor to rotate 5 minutes
15) Drain tank
16) Remove filter from tank and motor
17) Air dry filter for use Upon completion of the washing cycles, the drive motor 32, cage 34, and filter cartridge 10 may be easily removed from the tank by uncoupling of the drive motor 32 from the clamp 54. The cleaned filter cartridge 10 may then be removed from the cage 34 by removal of the bottom nut 50. It will be appreciated that the cleaning cycles are easily repeatable for enabling thorough, uniformly controlled cleaning of filter cartridges 10 without damage or delamination of the filter media 11.

Figure 10:
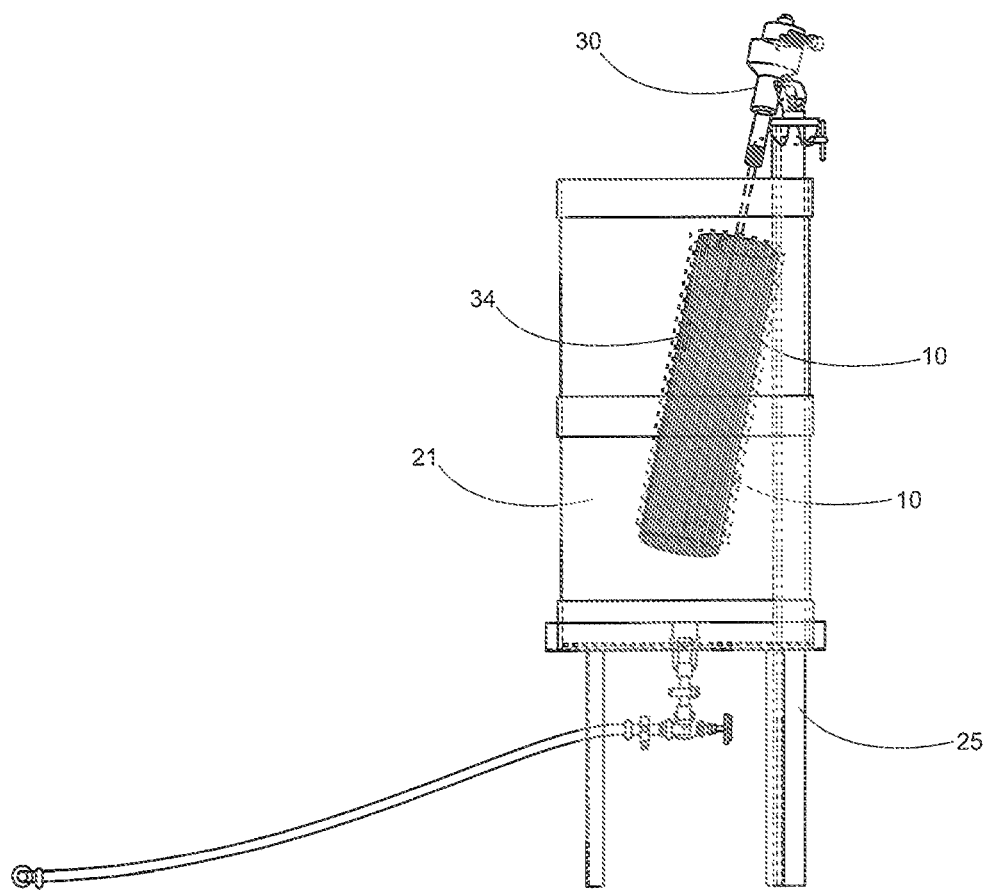
FIG. 10 is a side elevational view of an alternative embodiment of the filter cartridge cleaning system in accordance with the invention adapted for simultaneously cleaning a plurality of filter cartridges.
Figure 11:
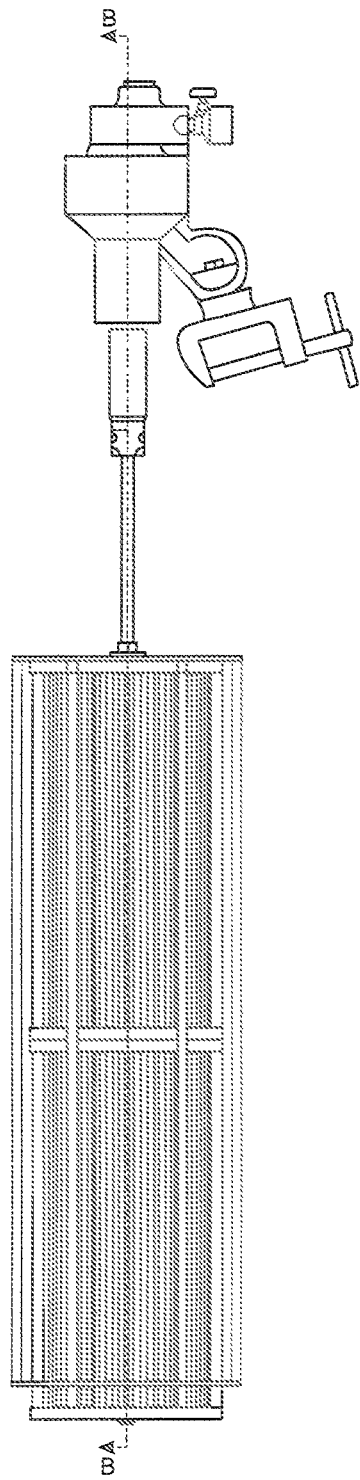
FIG. 11 is an enlarged side elevational view of the filter cartridge drive of the cleaning system shown in FIG. 10.
Figure 12:
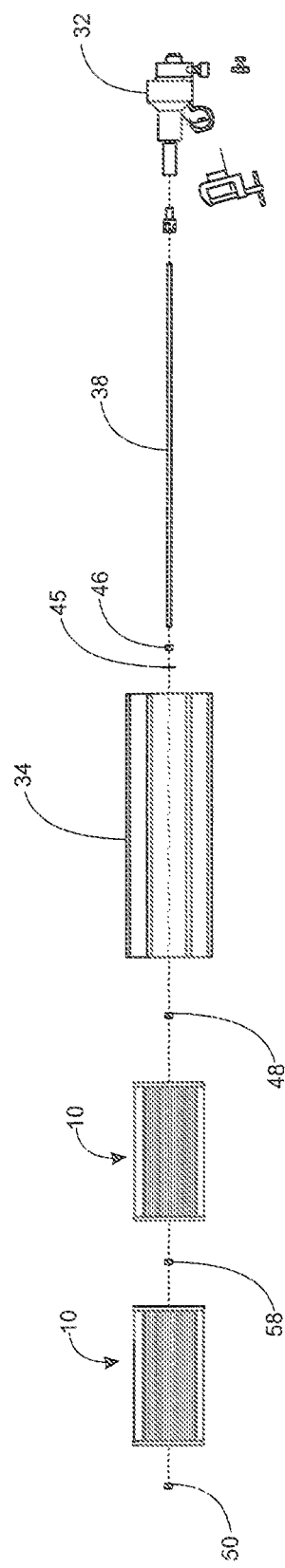
FIG. 12 is an exploded side elevational view of the filter cartridge drive shown in FIG. 11.

Alternative embodiments of filter cartridge cleaning systems according to the invention are depicted in FIGS. 10-16, wherein items similar to those described above have been given similar reference numerals. With reference to FIGS. 10-12, a filter cleaning system 20 is shown that is operable for simultaneously cleaning a plurality of filter cartridges 10. In this case, the filter cartridge containing cage 34 of the motorized drive 30 has an axial length sufficient for receiving and retaining two filter cartridges 10. The filter cartridges 10 are stacked in end to end relation in cage 34 and are securely retained against the upper support plate 40 of the cage 34 by the bottom nut 50 that again is threaded onto drive shaft 38 in tightly engaged relation to the bottom end cap 14 of the lower filter cartridge 10 and a further nut 58 that engages and retains the bottom end cap 14 of the upper filter cartridge 10. Operation of the drive motor 32 will simultaneously drive the cage 34 and the plurality of filter cartridges 10 supported and retained therein during the washing cycles.

Figure 13:
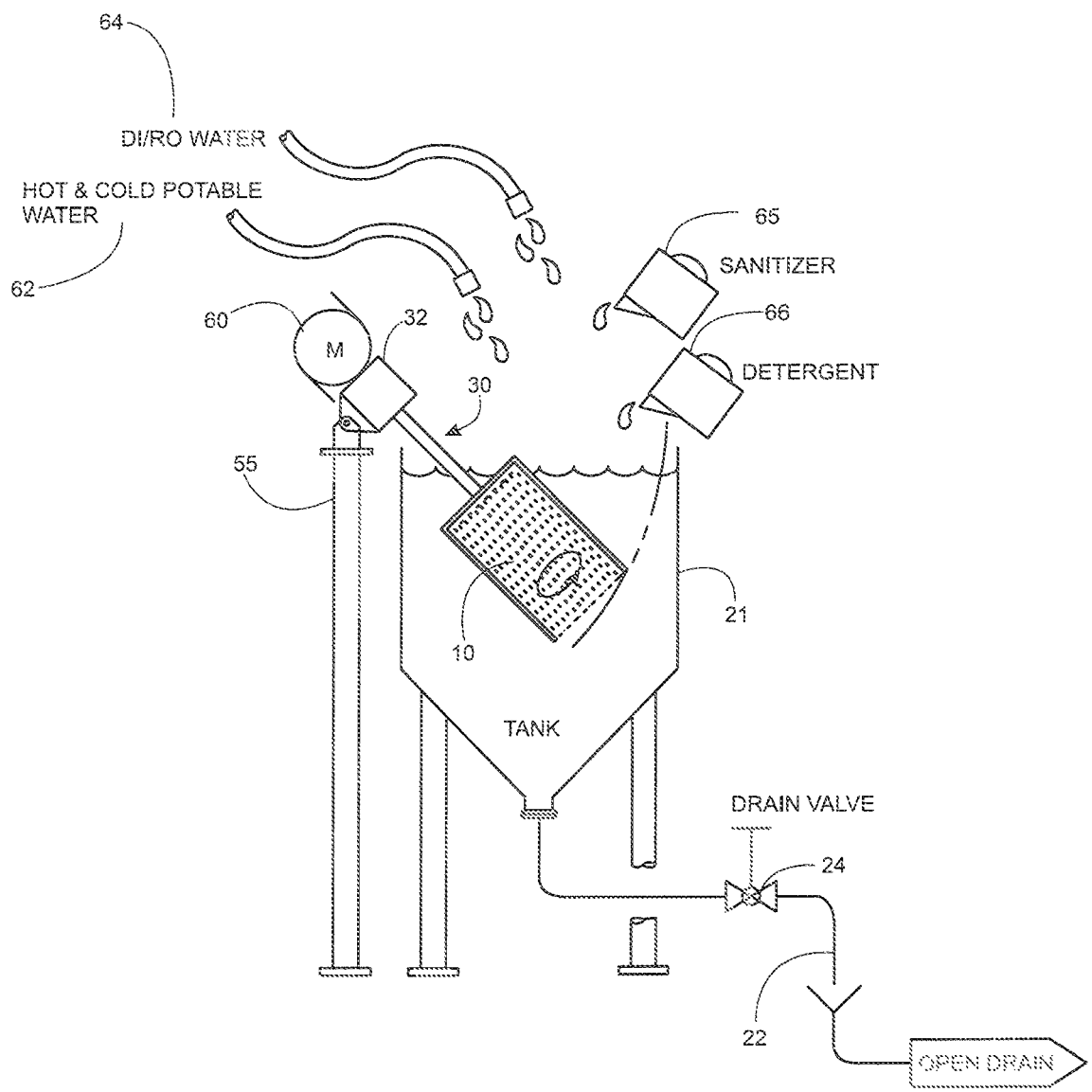
FIG. 13 is a diagrammatic depiction of another alternative embodiment of filter cartridge cleaning system in accordance with the invention.

FIG. 13, depicts an alternative embodiment where the filter cartridge drive 30 is supported on the upstanding support member 55 for pivotable movement as an incident to operation of a motor 60 between a lowered position in cleaning liquid in the tank 21 and a raised position for enabling removal and replacement of a filter cartridge 10 from the cage 34. Hot and cold potable water 62, deionized or reverse osmosis water 64, sanitizer 65, and/or detergent 66 cab be selectively directed into the tank during washing cycles. In this case, the tank is sufficiently large to enable pivotable movement of the cage 34 and filter cartridge 10 between such raised and lowered positions.

Figure 14:
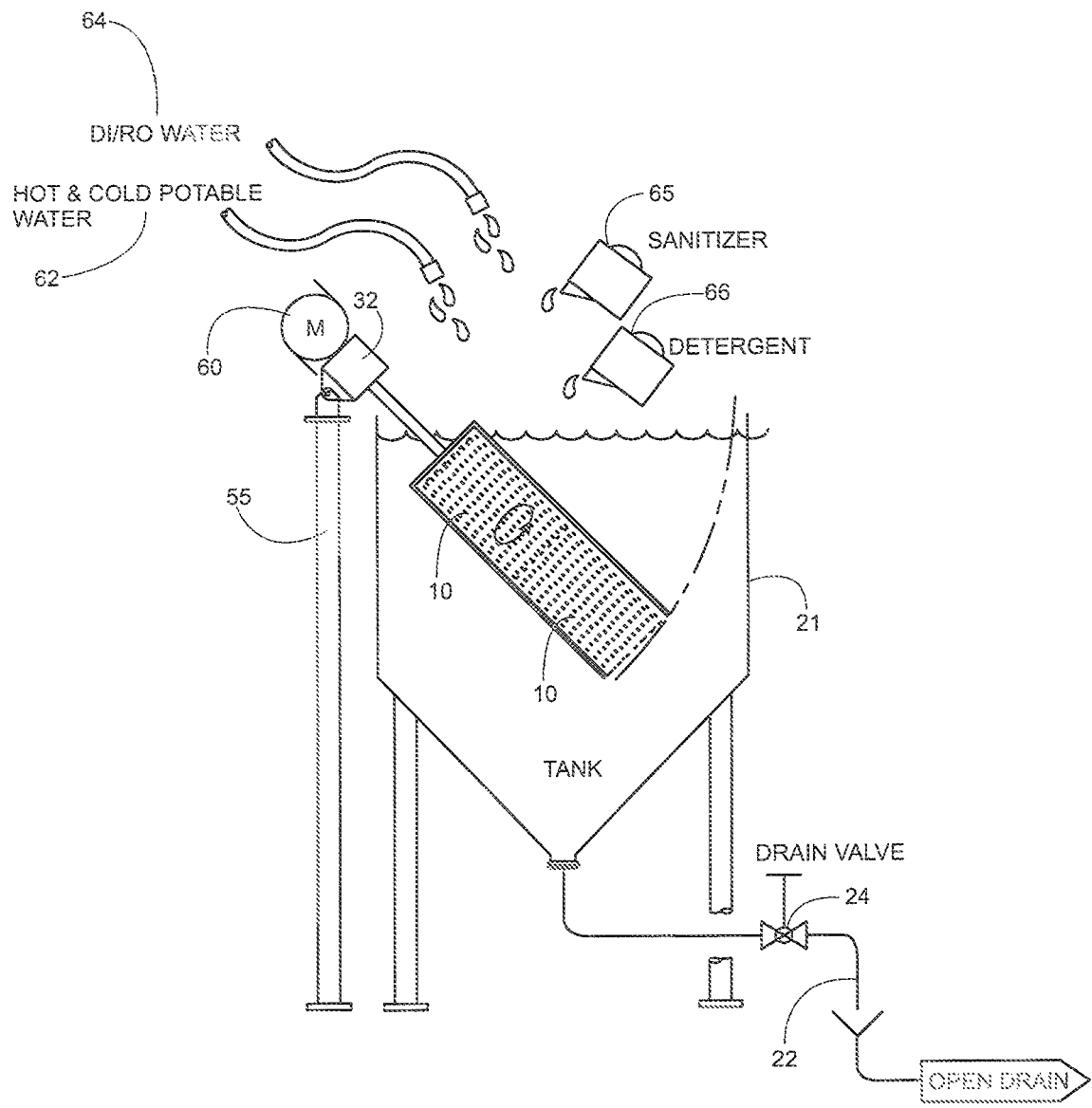
FIG. 14 is a diagrammatic depiction of a filter cartridge cleaning system, similar to FIG. 13, but adapted for simultaneously cleaning a plurality of filter cartridges.

FIG. 14 depicts a cartridge cleaning system similar to FIG. 13, but in which the cage 34 of the motorized drive 30 is sized for containing a plurality of filter cartridges 10 in stacked relation to each other as described above.

Figure 15:
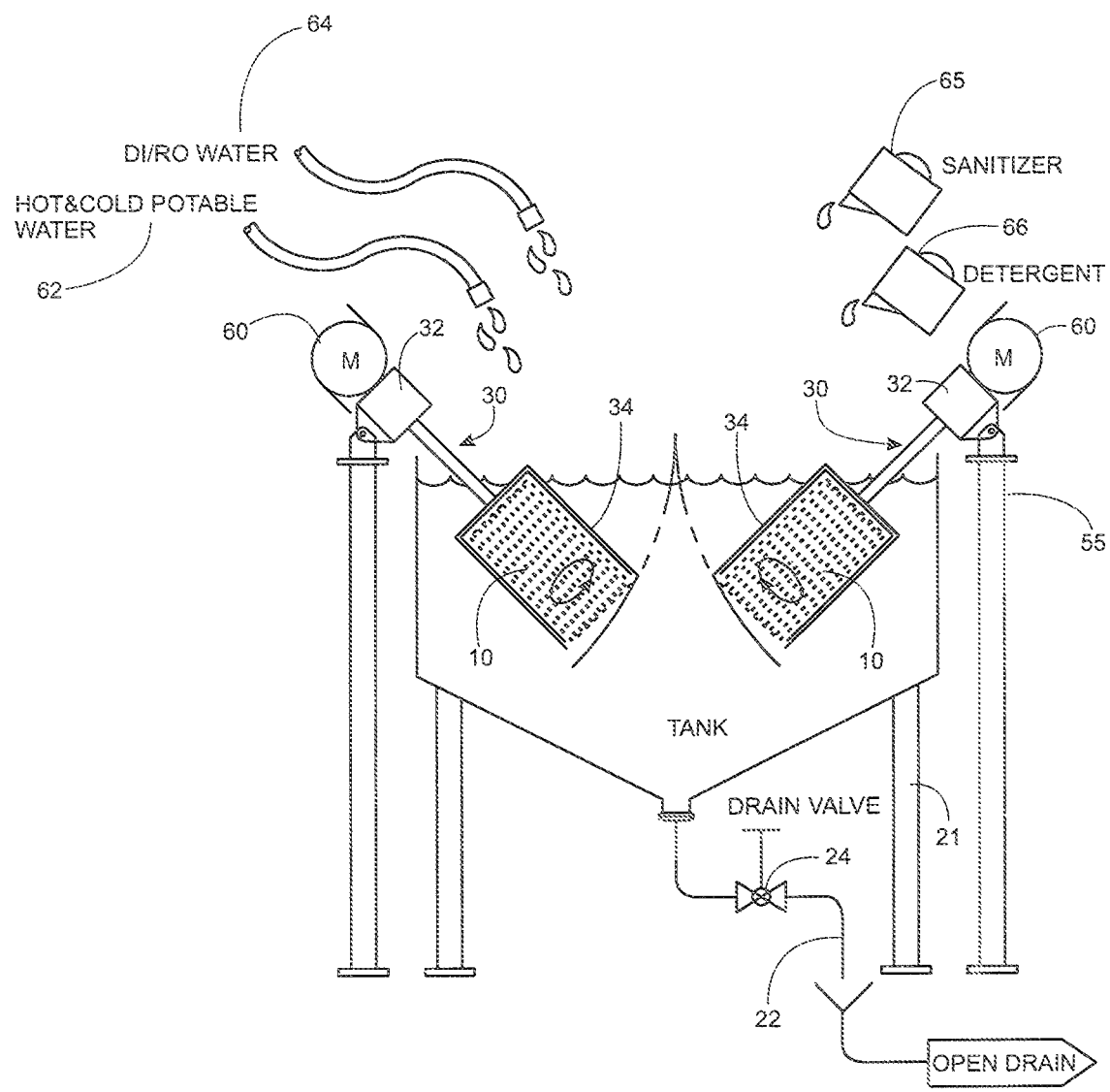
FIG. 15 is a diagrammatic depiction of still a further embodiment of filter cartridge system in accordance with the invention effective for simultaneously cleaning a plurality of filter cartridges.

FIG. 15 also depicts a cleaning system for simultaneously cleaning a plurality of filter cartridges 10, but in this instance by means of a pair of motor pivoted filter cartridge containing cages 34, such as shown in FIG. 13, on opposite sides of the cleaning tank 21.

Figure 16:
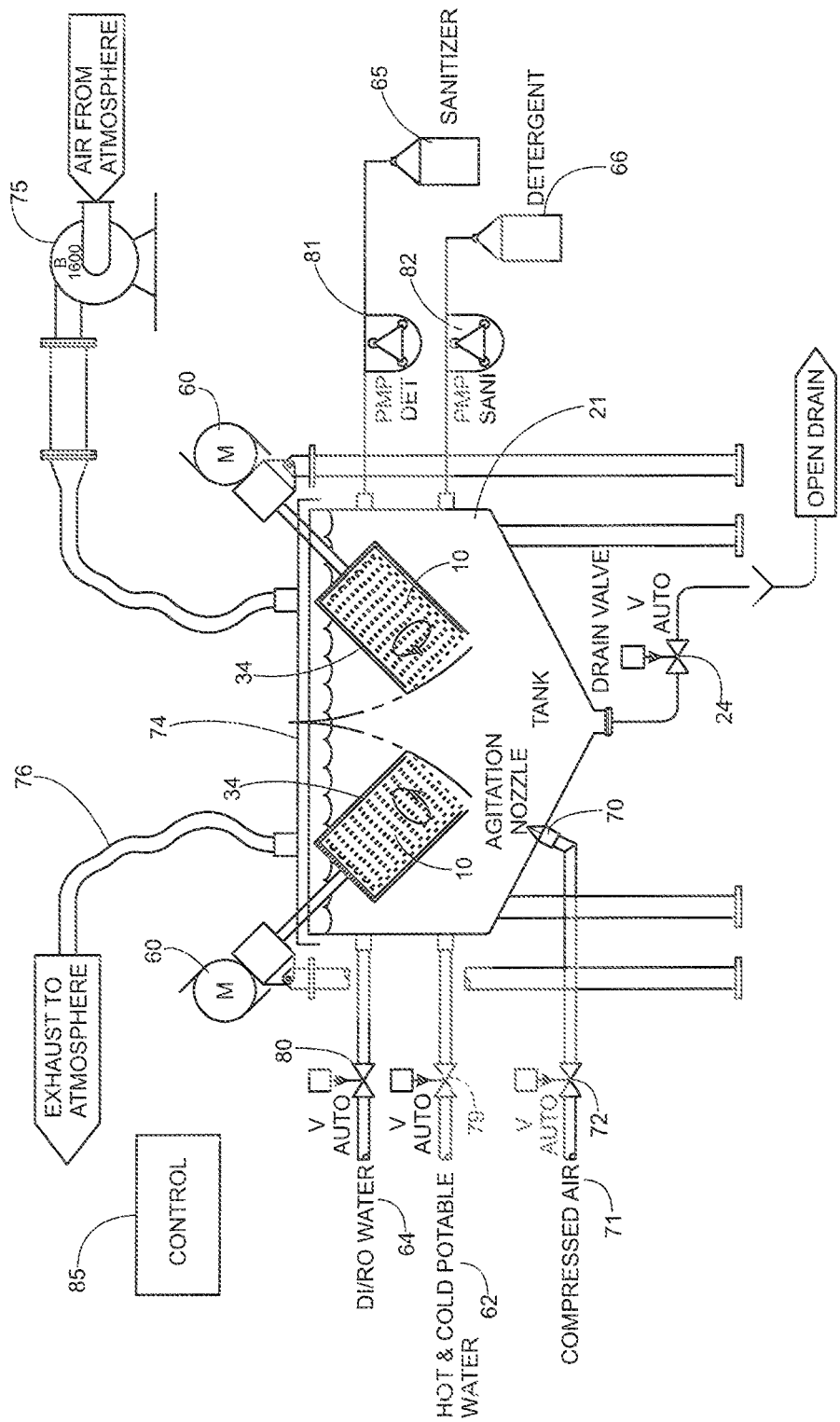
FIG. 16 is a diagrammatic depiction of still another further alternative embodiment of filter cartridge cleaning system according to the invention.

Still another alternative embodiment is disclosed in FIG. 15, which similar to FIG. 16 includes a pair of motor pivoted filter cartridge containing cages 34. In this embodiment, to facilitate agitation of the cleaning liquid, and hence enhanced cleaning action of the filter cartridges 10, a cleaning liquid agitation nozzle 70 is mounted in an underside of the tank 21 for coupling to a selectively operable compressed air source 71 controlled by a valve. The tank 21 in this instance also is enclosed by a top lid 74 and air from the atmosphere is directed into the enclosure by a pump 75 with air exiting to atmosphere by an outlet line 76. The compressed air pump 75, control valves 72, 79, 80, 81, 82 and 24 for the compressed air 71, hot and cold potable water 62, deionized/reverse osmosis water 64, sanitizer 65, detergent 82, and drain valve 24 are selectively controllable by a central control 85 for particular cleaning cycles.

From the foregoing, it can be seen that a system is provided for cleaning filter cartridges having a pleated filter media that is more effective and reliable in usage. The system can be operated in a repeatable fashion for controlled cleaning of the media without damage to the filter media or delamination of outer membranes. The system further is operable for simultaneously cleaning a plurality of such filter cartridges, can be automatically controlled, and can be operated without creating a harmful environment to the operator.

What is claimed:

1. A system for cleaning filter cartridges having a cylindrically configured filter media comprising:
a cage for removably receiving and containing one of the filter cartridges to be cleaned;
a tank for containing a cleaning liquid;
a motorized drive including a drive motor having a drive shaft, said drive shaft being coupled to said cage for supporting said cage and the filter cartridge contained therein in said tank, said cage having open sides such that when said cage and the filter cartridge contained therein are immersed in cleaning liquid contained in the tank the cleaning liquid contacts the filter media of the filter cartridge through the open sides of the cage; and
said drive motor being selectively operable for rotating said cage and the filter cartridge contained therein during a cleaning cycle for cleaning of the filter media of the filter cartridge contained in the cage.

2. The filter cartridge cleaning system of claim 1 in which said drive motor and drive shaft are selectively positionable between a first position in which said cage and the filter cartridge contained therein are removed from cleaning liquid in said tank for enabling removal and replacement of the filter cartridge in the cage; and a second position in which the cage and the filter cartridge contained therein are immersed in the cleaning liquid in said tank for a cleaning cycle.

3. The filter cartridge cleaning system of claim 2 including a support for supporting said drive motor and drive shaft for pivotable movement that moves said cage and the filter cartridge contained therein between said first and second positions.

4. The filter cartridge cleaning system of claim 1 in which said cage comprises an upper circular plate and a lower ring sized larger in diameter than the filter cartridge contained therein, and a plurality of circumferentially spaced support rods interconnected between said upper circular plate and lower ring that define side openings for the passage of cleaning liquid in said tank into contact with the filter cartridge contained in the cage when immersed in cleaning liquid in said tank.

5. The filter cartridge cleaning system of claim 4 in which said support rods are circular in cross section.

6. The filter cartridge cleaning system of claim 4 in which said support rods are rectangular in cross section.

7. The filter cartridge cleaning system of claim 1 in which said motorized drive is reversably operable for sequentially rotating said drive shaft, cage, and the filter cartridge contained therein in forward and reverse rotary directions to facilitate cleaning of the filter media of the filter cartridge contained in the cage.

8. A system for cleaning filter cartridges having a cylindrically configured pleated filter media with end caps at opposite upper and lower ends each having a central opening comprising:
a cage for removably receiving and containing one of said filter cartridges to be cleaned;
a tank for containing a cleaning liquid;
a motorized drive including a drive motor having a drive shaft, said drive shaft being coupled to said cage for supporting said cage and the filter cartridge contained therein, said drive shaft extending centrally through said cage and the central openings in the upper and lower end caps of the filter cartridge contained therein,
at least one fastener for securing said cage to said drive shaft;
said motorized drive supporting said cage and the filter element contained therein immersed in cleaning liquid contained in said tank; said cage having open sides such that cleaning liquid contained in said tank contacts the filter cartridge through said open sides of the cage; and
said drive motor being selectively operable for rotating drive shaft, cage, and the filter cartridge contained therein during a cleaning cycle for cleaning of the pleated filter media of cartridge contained in the cage.

9. The filter cartridge cleaning system of claim 8 in which said cage includes a top plate, said drive shaft being threaded, and said at least one fastener includes a first nut threaded onto said drive shaft in engagement with said top plate of the cage.

10. The filter cartridge cleaning system of claim 9 including a second nut screwed onto said threaded drive shaft engaged with the lower end cap of the filter cartridge to be cleaned for securing the filter cartridge within the cage.

11. The filter cartridge cleaning system of claim 8 in which said drive motor and drive shaft of said motorized drive are selectively positionable between a first position in which said cage and the filter cartridge contained therein are removed from cleaning liquid in said tank for enabling removal and replacement of the filter cartridge in the cage; and a second position in which the cage and the filter cartridge contained therein are immersed in cleaning liquid in said tank for a cleaning cycle.

12. The filter cartridge cleaning system of claim 11 including a support for supporting said drive motor and drive shaft of said first motorized drive in said tank for pivotable movement that moves said cage and the filter cartridge contained therein between said first and second positions.

13. The filter cartridge cleaning system of claim 8 in which said cage comprises an upper circular plate and a lower ring sized larger than the filter cartridge contained therein, and a plurality of circumferentially spaced support rods interconnected between said upper circular plate and lower ring that define side openings for the passage of cleaning liquid in said tank into contact with the filter cartridge contained in the cage when immersed in cleaning liquid in said tank.

* * * * *